United States Patent
Kokubo

(10) Patent No.: US 6,983,378 B1
(45) Date of Patent: Jan. 3, 2006

(54) DATA STORAGE DEVICE AND DETECTION METHOD

(75) Inventor: Kenichi Kokubo, Toyko (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/466,925

(22) Filed: Dec. 20, 1999

(30) Foreign Application Priority Data

Jan. 18, 1999 (JP) ................................. 11/009568

(51) Int. Cl.
*G06F 11/30* (2006.01)

(52) U.S. Cl. ...................................... 713/201; 713/194

(58) Field of Classification Search ................ 700/200; 380/3; 713/194, 200–201, 165; 711/100; 235/437, 439, 440–441, 444, 446, 450, 451, 235/453; 701/8; 348/373, 818, 823–824, 348/828

See application file for complete search history.

(56) References Cited

U.S. PATENT DOCUMENTS

| | | | | |
|---|---|---|---|---|
| 4,691,350 A | * | 9/1987 | Kleijne et al. ................. | 380/3 |
| 5,353,350 A | * | 10/1994 | Unsworth et al. ........... | 713/194 |
| 5,787,054 A | * | 7/1998 | Yasukawa et al. .......... | 368/204 |
| 6,046,678 A | * | 4/2000 | Wilk ..................... | 340/686.01 |
| 6,172,616 B1 | * | 1/2001 | Johnson et al. ............. | 380/870 |
| 6,182,896 B1 | * | 2/2001 | Momose ..................... | 235/449 |

\* cited by examiner

*Primary Examiner*—Kim Vu
*Assistant Examiner*—Leynna T. Ha
(74) *Attorney, Agent, or Firm*—McGinn IP Law Group, PLLC

(57) ABSTRACT

A memory stores confidential data Da. An unqualified person who intends to irregularly read out the confidential data Da tries to open a cover of a housing, break the housing, or drill through the housing. The housing deflects by physical impact applied thereto. Positional relations among pairs of electrodes also deflects in accordance with the deflection of the housing. The deflection of the positional relations among the electrodes shifts capacitance at the electrodes. A data management processor deletes the confidential data Da when it detects the capacitance shifts.

10 Claims, 3 Drawing Sheets

DATA STORAGE DEVICE AND DETECTION METHOD

BACKGROUND OF THE INVENTION

1. Field of the Invention

The present invention relates to a data storage device having a storage medium such as a memory for storing data including confidential data, more particularly to a data storage device which prevents stored data from being irregularly read out, and a detection method for detecting dismantlement of a storage device housing.

2. Description of the Related Art

Conventional computer systems for processing charge affairs by dealing with monetary data have usually employed key cryptography system in order to encrypt (encode) monetary data when updating the data. In such the computer system, a data storage device stores confidential data such as keys for cryptography in order to prevent the monetary data from being falsified.

In order to prevent stored data from being irregularly read out (stolen) by an unqualified person, data storage device generally performs predetermined processing when it detects dismantlement of the device (housing). For example, a conventional storage device has employed micro switches arranged in its cover or the like, in order to detect dismantlement of the device by sensing signal changes caused by the micro switches.

Such the conventional storage device comprising the micro switches, however, could not find dismantlement perfectly, because the micro switches are not switched if portions having no switches are processed to dismantle the device. In other words, once position of the micro switches is revealed, the conventional storage device is no longer effective in data protection.

SUMMARY OF THE INVENTION

It is an object of the present invention to provide a data storage device and a detection method for effectively detecting dismantlement of a housing.

To accomplish the above object, a data storage device according to a first aspect of the present invention comprises:

storage means, installed in a housing, for storing predetermined confidential data;

data generation means for generating data representing deflection of the housing in which the storage means is installed; and detection means for detecting physical impact applied to the housing in accordance with the data generated by the data generation means.

According to this invention, the storage means is, for example, a memory or the like for storing the which is installed in the housing and stores the predetermined confidential data. The data generation means comprises a plurality of electrodes arranged at predetermined positions in the housing, and generates data representing deflection of the housing in which the storage means is installed. The detection means detects physical impact applied to the housing in accordance with the data generated by the data generation means. As a result, the data storage device detects dismantlement of the housing effectively.

To accomplish the above object, a data storage device according to a second aspect of the present invention comprises:

storage means, installed in a housing, for storing predetermined confidential data;

data generation means for generating data representing deflection of the housing in which the storage means is installed;

detection means for detecting physical impact applied to the housing by specifying the deflection of the housing in accordance with the data generated by the data generation means; and data cancel means for canceling the confidential data stored in the storage means when the detection means detects physical impact applied to the housing.

According to this invention, the storage means is, for example, a memory or the like for storing the which is installed in the housing and stores the predetermined confidential data. The data generation means comprises a plurality of electrodes arranged at predetermined positions in the housing, and generates data representing deflection of the housing in which the storage means is installed. The detection means detects physical impact applied to the housing in accordance with the data generated by the data generation means. The data cancel means cancels the confidential data stored in the storage means when the detection means detects physical impact applied to the housing. As a result, the data storage device detects dismantlement of the housing effectively. Moreover, it prevents the confidential data from being irregularly read out by an unqualified person.

The above data storage device may further comprise:

measure means for measuring temperature in the housing in which the storage means is installed; and correction means for correcting the data generated by the data generation means in accordance with the temperature measured by the measure means, wherein the detection means may detect the physical impact applied to the housing in accordance with the data representing the deflection after the correction by the correction means. In this case, since tolerable housing deflection caused by heat is ignored, dismantlement of the housing is detected effectively without misdetection.

To accomplish the above object, a data storage device according to a third aspect of the present invention comprises:

a memory, installed in a tight housing having predetermined shape, for storing predetermined confidential data;

a plurality of electrodes, arranged in the housing in which the memory is installed, for generating predetermined capacitance; and a detection processor for detecting physical impact applied to the housing in accordance with shift degrees of the capacitance at the electrodes.

According to this invention, the memory is installed in the tight housing having the predetermined shape, and stores the predetermined confidential data such as keys for cryptography. The plurality of electrodes are arranged in the housing in which the memory is installed, and generate capacitance based on predetermined charges and potential differences at paired electrodes. The detection processor detects physical impact applied to the housing in accordance with shifts of the capacitance at the electrodes. As a result, the data storage device detects dismantlement of the housing effectively.

To accomplish the above object, a data storage device according to a fourth aspect of the present invention comprises:

a memory, installed in a tight housing having predetermined shape, which stores predetermined confidential data;

a plurality of electrodes, arranged in the housing in which the memory is installed, which generates predetermined capacitance;

a detection processor which specifies deflection of the housing in accordance with shift degrees of the capacitance at the electrodes to detect physical impact applied to the housing; and a data canceler which cancels the confidential data stored in the memory when the detection processor detects the physical impact applied to the housing.

According to this invention, the memory is installed in the tight housing having the predetermined shape, and stores the predetermined confidential data such as keys for cryptography. The plurality of electrodes are arranged in the housing in which the memory is installed, and generate capacitance based on predetermined charges and potential differences at paired electrodes. The detection processor detects physical impact applied to the housing in accordance with shifts of the capacitance at the electrodes. The data canceler cancels the confidential data stored in the memory when the detection processor detects physical impact applied to the housing. As a result, the data storage device detects dismantlement of the housing effectively. Moreover, it prevents the confidential data from being irregularly read out by an unqualified person.

The above data storage device may further comprise:

a thermo-sensor which measures temperature in the housing in which the memory in installed; and a correction processor which corrects the shift degrees of the capacitance at the electrodes in accordance with the temperature measured by the thermo-sensor, wherein the detection processor may detect the physical impact applied to the housing in accordance with the deflection of the housing after the correction by the correction processor. In this case, since tolerable housing deflection caused by heat is ignored, dismantlement of the housing is detected effectively without misdetection.

To accomplish the above object, a detection method according to a fifth aspect of the present invention comprises:

generating data representing deflection of a housing in which a storage device for storing predetermined confidential data is installed; and detecting physical impact applied to the housing in accordance with the data generated by the generating data.

According to this invention, the generating data generates the data representing the deflection of the housing in which the storage device storing the predetermined confidential data is installed. The detecting physical impact detects the physical impact applied to the housing in accordance with the data generated by the generating data. As a result, the detection method detects dismantlement of the housing effectively.

To accomplish the above object, a detection method according to a sixth aspect of the present invention comprises:

generating data representing deflection of a housing in which a storage device for storing predetermined confidential data is installed, measuring temperature in the housing in which the storage device is installed;

correcting data generated by the generating data in accordance with the temperature measured by the measuring temperature; and detecting physical impact applied to the housing by specifying the deflection of the housing in accordance with the data representing the deflection of the housing after correction by the correcting data.

According to this invention, the generating data generates the data representing the deflection of the housing in which the storage device storing the predetermined confidential data is installed. The measuring temperature measures temperature in the housing in which the storage device is installed. The correcting data corrects the data generated by the generating data in accordance with the temperature measured by the measuring temperature. The detecting physical impact detects the physical impact applied to the housing by specifying the data representing the deflection of the housing after the correction by the correcting data. As a result, since tolerable deflection of the housing caused by heat is ignored, the detection method detects dismantlement of the housing effectively without misdetection.

To accomplish the above object, a detection method according to a seventh aspect of the present invention comprises:

measuring capacitance at a plurality of electrodes arranged in a tight housing in which a memory for storing predetermined confidential data is installed; and detecting physical impact applied to the housing in accordance with shift degrees of the capacitance measured by the measuring capacitance.

According to this invention, the measuring capacitance measures the capacitance at paired electrodes arranged in the housing in which the memory storing the predetermined confidential data is installed. The detecting physical impact detects the physical impact applied to the housing in accordance with shifts of the capacitance measured by the measuring capacitance. As a result, the detection method detects dismantlement of the housing effectively.

To accomplish the above object, a detection method according to a eighth aspect of the present invention comprises:

measuring capacitance at a plurality of electrodes arranged in a housing in which a memory for storing predetermined confidential data is installed;

measuring temperature in the housing in which the memory is installed;

correcting the capacitance measured by the measuring capacitance in accordance with the temperature measured by the measuring temperature; and detecting physical impact applied to the housing by specifying deflection of the housing in accordance with shift degrees of the capacitance after the correction by the correcting the capacitance.

According to this invention, the measuring capacitance the capacitance between electrodes of each pair arranged in the housing in which the memory storing the predetermined confidential data is installed. The measuring temperature measures the temperature in the housing in which the memory is installed. The correcting the capacitance corrects the capacitance measured by the measuring capacitance in accordance with the temperature measured by the measuring temperature. The detecting physical impact detects the physical impact applied to the housing by specifying deflection of the housing in accordance with shifts of the capacitance after the correction by the correcting the capacitance. As a result, since tolerable deflection of the housing is ignored, the detection method detects dismantlement of the housing effectively without misdetection.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

Figure 1:
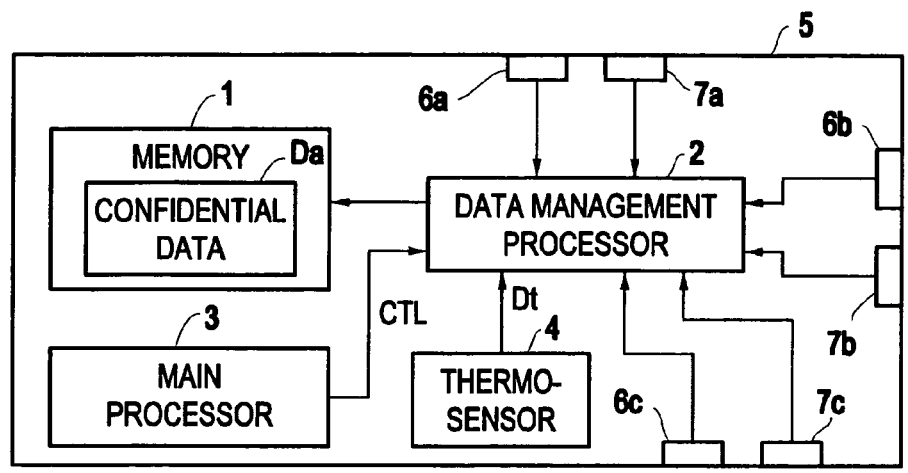
FIG. 1 is a block diagram exemplifying a data storage device according to an embodiment of the present invention.

An embodiment of the present invention will now be described in detail with reference to accompanying drawings. FIG. 1 is a block diagram exemplifying a data storage device according to the embodiment of the present invention.

As shown in FIG. 1, the data storage device comprises a memory 1, a data management processor 2, a main processor 3, a thermo-sensor 4, a housing 5, and electrodes 6a, 6b, 6c, 7a, 7b and 7c.

The memory 1 is managed by the data management processor 2, and stores confidential data Da such as keys for cryptography.

The data management processor 2 manages the confidential data Da stored in the memory 1. The data management processor 2 detects externally applied physical impact caused by dismantling the housing 5 in accordance with degree of capacitance shifts at the electrodes 6a to 7c. If dismantlement of the housing 5 is detected, the data management processor 2 deletes (cancels) the data Da in the memory 1. The data management processor 2 corrects the capacitance shifts at the electrodes 6a to 7c in accordance with temperature data Dt supplied from the thermo-sensor 4.

The main processor 3 controls the data management processor 2 by supplying a control signal CTL thereto.

The main processor 3 also performs general processing for the data storage device. For example, the main processor 3 encodes (encrypts) and decodes desired data with utilizing the confidential data Da stored in the memory 1.

The thermo-sensor 4 measures temperature in the housing 5 and sends temperature data Dt representing the temperature, to the data management processor 2 on real time.

Figure 2:
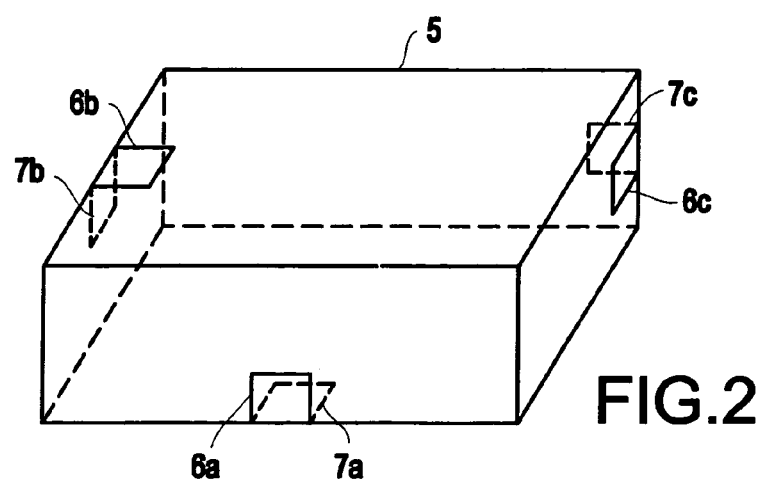
FIG. 2 is a perspective view exemplifying appearance of the data storage device according to the embodiment of the present invention.

The housing 5 is, for example, a box like housing shown in FIG. 2 in which the memory 1, the data management processor 2, the main processor 3, the thermo-sensor 4, and the electrodes 6a to 7c are installed.

The electrodes 6a, 6b, 6c, 7a, 7b and 7c are electrodes having predetermined shape. For example, the electrodes 6a to 7c are arranged on inner surfaces of the housing 5 at predetermined positions, as shown in FIG. 2. And the electrodes form three pairs, 6a–7a, 6b–7b and 6c–7c. Each of those pairs generate capacitance based on charges and potential difference between the electrodes of each pair.

Since the electrodes 6a to 7c are arranged on the inner surfaces of the housing 5, positional shift or the like between the electrodes of each pair when the housing 5 is deflected (transformed). The positional shift between the electrodes of each pair causes capacitance shift. Therefore, the electrodes 6a to 7c generate capacitance corresponding to deflection of the housing 5.

The electrodes 6a to 7c are scattered so that each inner surface of the housing 5 has one electrode while the electrodes forming the pairs. This structure allows the storage device to detect deflection of the housing 5 caused by physical impact even if it is applied to anywhere on the housing 5. The number of the electrodes 6a to 7c or positions thereof may be modified in accordance with shape of the housing 5.

Figure 3:
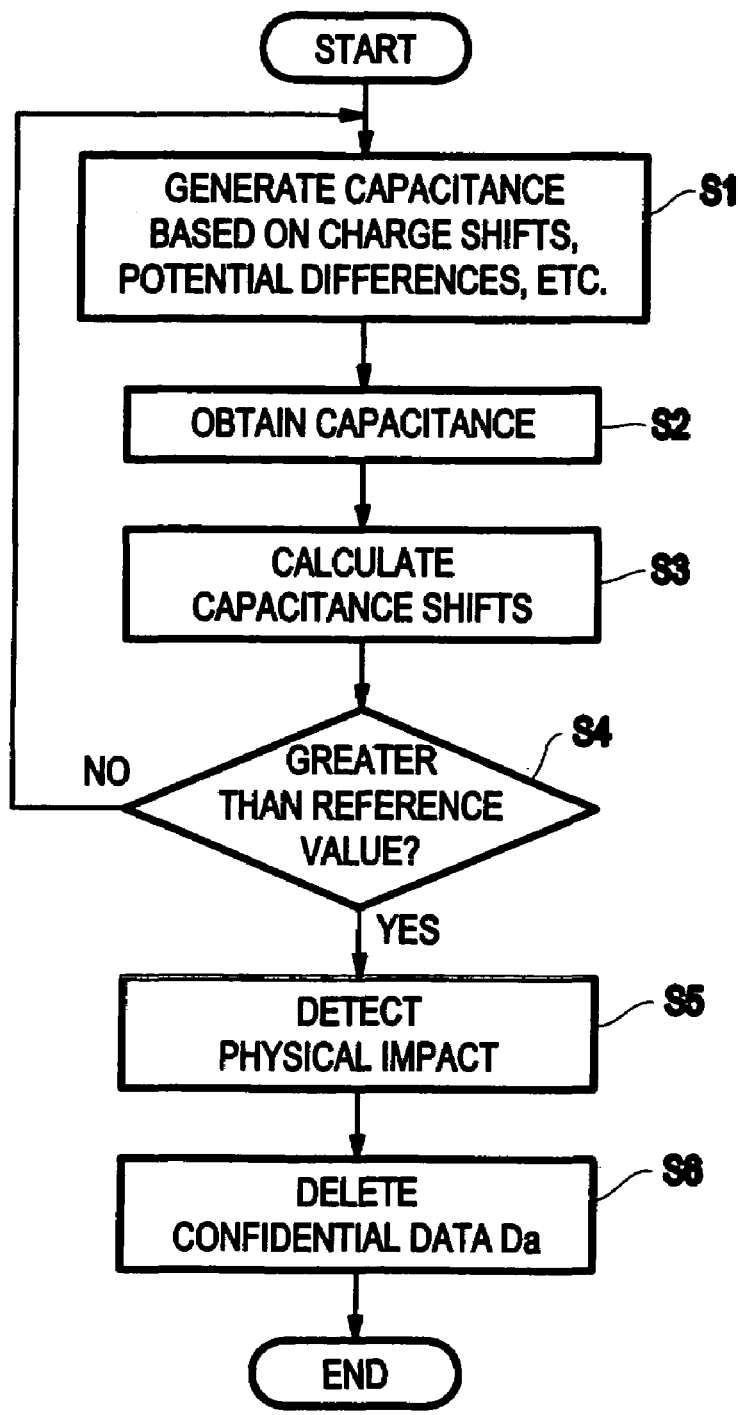
FIG. 3 is a flowchart showing a basic process flow executed by the data storage device according to the embodiment of the present invention.
Figure 4:
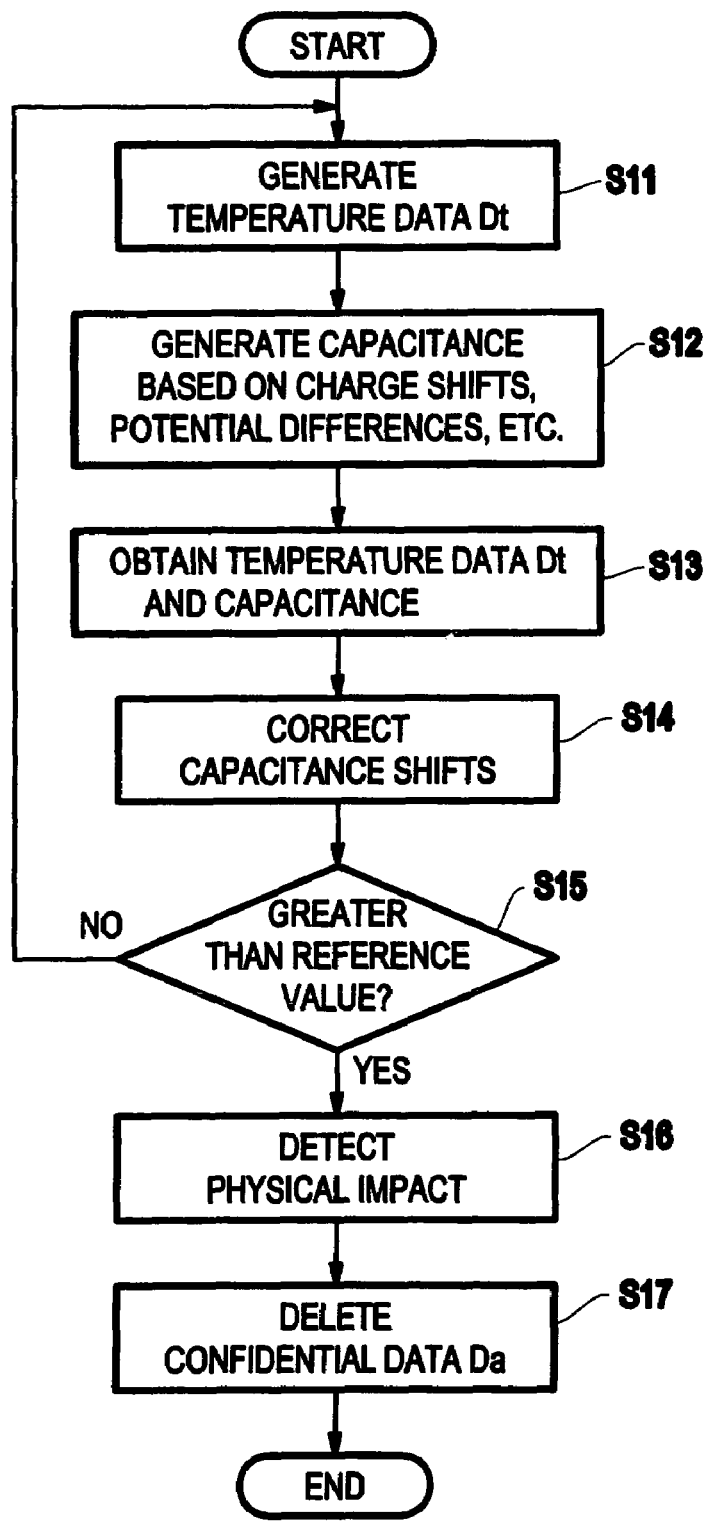
FIG. 4 is a flowchart showing a process flow relating to temperature sensing executed by the data storage device according to the embodiment of the present invention.

Operations of the data storage device according to the embodiment of the present invention will now be described with reference to flowcharts shown in FIGS. 3 and 4.

Basic operations of the data storage device will now be described with reference to FIG. 3.

The electrodes 6a to 7c generate capacitance based on charges, potential differences, etc. between the electrodes of each pair (step S1). In other words, the electrodes 6a to 7c generate capacitance to be utilized for measuring deflection of the housing 5.

The data management processor 2 obtains the capacitance at the electrodes 6a to 7c at predetermined timings (step S2). The data management processor 2 compares present capacitance with former one to find difference (step S3). In other words, the data management processor 2 monitors deflection of the housing 5 by sensing capacitance shifts.

An unqualified person who intends to read the confidential data irregularly, tries to dismantle the housing 5. Ways for the dismantlement may be opening a cover of the housing 5, breaking the housing 5, drilling through the housing 5, or the like. Such the physical impact onto the housing 5 causes deflection of the housing 5.

In accordance with the deflection of the housing 5, positional relations among the electrodes 6a to 7c (electrode pairs) on the inner surfaces of the housing 5 are also changed. In other words, positional shift appears between the electrodes of each of the pairs 6a–7a, 6b–7b and 6c–7c, in accordance with the deflection of the housing 5. The positional shift at the electrode pair causes charge shifts or potential differences, thus, capacitance shifts.

The data management processor 2 discriminates whether degree of the capacitance shifts exceeds a predetermined reference value or not (step S4). When the data management processor 2 determines that the shift degree of capacitance is in a regular range less than the predetermined value, the flow returns to step S1. Then, steps S1 to S4 are executed repeatedly.

On the contrary, when the shift degree of capacitance exceeds the reference value, the data management processor 2 recognizes that the housing 5 is deflected (physical impact is applied to somewhere on the housing 5) (step S5). That is, the data management processor 2 detects dismantlement of the housing 5 based on the capacitance shifts.

Once the dismantlement of the housing 5 is detected, the data management processor 2 deletes the confidential data Da in the memory 1 (step S6).

According to the above described operation, the data storage device according to the embodiment of the present invention realizes improved detection for dismantlement of the housing 5. As a result, the confidential data Da is protected from being irregularly read out by unqualified persons.

In fact, thermal expansion caused by heat from the data management processor 2 and the like may deflect the housing 5 slightly. In order to ignore such tolerable deflection of the housing 5 caused by heat, the data management processor 2 monitors temperature sensed by the thermo-sensor 4, and corrects capacitance shifts at the electrodes 6a to 7c resulting from deflection of the housing 5 caused by the thermal expansion.

Operations of the data storage device including temperature sensing will now be described with reference to FIG. 4.

The thermo-sensor 4 continuously measures temperature in the housing 5 and generate temperature data Dt representing the measured temperature (step S11). Simultaneously, the electrodes 6a to 7c generate capacitance based on charge shifts or potential differences between the electrodes of each pair (step S12).

The data management processor 2 obtains the temperature data Dt from the thermo-sensor 4 and the capacitance from the electrodes 6a to 7c (step S13).

The data management processor 2 corrects capacitance shifts with referring to the obtained temperature data Dt (step S14). In other words, the data management processor 2 calculates deflection of the housing 5 caused by heat in accordance with the temperature data Dt from the thermo-sensor 4. The data management processor 2 corrects the capacitance shifts at the electrodes 6a to 7c in accordance with the calculated deflection, so as to ignore deflection caused by heat.

The data management processor 2 discriminates whether degree of the corrected capacitance shifts exceeds a predetermined reference value or not (step S15). When the data management processor 2 determines that the degree of the capacitance shift is within a regular range less than the reference value, the flow returns to step S11. Then, steps S11 to S15 are executed repeatedly.

On the contrary, when the degree of the capacitance shift exceeds the reference value, the data management processor 2 recognizes that the housing 5 is deflected (physical impact is applied to somewhere on the housing 5) (step S16). That is, the data management processor 2 detects dismantlement of the housing 5 based on the capacitance shifts.

Once the dismantlement of the housing 5 is detected, the data management processor 2 deletes the confidential data Da in the memory 1 (step S17).

According to the above described operation, the data storage device according to the embodiment of the present invention realizes improved detection for dismantlement of the housing 5 while ignoring tolerable deflection of the housing 5 caused by heat.

The above embodiment has exemplified the data storage device as a device which performs encryption with using the confidential data Da, however, the storage device may handle arbitrary data and processing.

As described above, the data storage device according to the embodiment of the present invention senses capacitance shifts at electrode pairs on the inner surfaces of the housing, and detects physical impact externally applied to the housing. This structure accomplishes improved detection of physical impact even if the impact is applied to anywhere on the housing, which has not been realized by the conventional data storage device employing micro switches or the like. As a result, the present invention realizes effective detection of housing dismantlement.

According to the structure of the present invention, stored confidential data are deleted when housing dismantlement is detected. This structure prevents the confidential data from being irregularly read out by an unqualified person.

Moreover, the present invention corrects capacitance shift based on temperature data, thus, tolerable deflection of the housing caused by heat is ignored. This structure accomplishes effective detection of housing dismantlement without misdetection.

This application is based on Japanese Patent Application No. H11-009568 filed on Jan. 18, 1999, and including specification, claims, drawings and summary. The disclosure of the above Japanese Patent Application is incorporated herein by reference in its entirety.

What is claimed is:

1. A data storage device comprising:
   storage means, installed in a housing, for storing predetermined confidential data;
   data generation means comprising two electrodes disposed on said housing for generating data representing a deflection of said housing in which said storage means is installed;
   detection means for detecting a physical impact applied to said housing in accordance with the data generated by said data generation means;
   measure means for measuring a temperature in said housing in which said storage means is installed; and
   correction means for correcting the data generated by said data generation means in accordance with the temperature measured by said measure means,
   wherein said detection means detects the physical impact applied to said housing in accordance with the data representing the deflection after the correction by said correction means.

2. A data storage device comprising:
   storage means, installed in a housing, for storing predetermined confidential data;
   data generation means comprising two electrodes disposed on said housing for generating data representing a deflection of said housing in which said storage means is installed;
   detection means for detecting a physical impact applied to said housing by specifying the deflection of said housing in accordance with the data generated by said data generation means;
   data cancel means for canceling the confidential data stored in said storage means when said detection means detects physical impact applied to said housing;
   wherein said data representing deflection of said housing represents a change of capacitance between the two electrodes that are disposed on said housing;
   measure means for measuring a temperature in said housing in which said storage means is installed; and
   correction means for correcting the data generated by said data generation means in accordance with the temperature measured by said measure means,
   wherein said detection means detects the physical impact applied to said housing in accordance with the data representing the deflection after the correction by said correction means.

3. A data storage device comprising:
   a memory, installed in a housing having predetermined shape, for storing predetermined confidential data;
   a plurality of electrodes disposed on said housing in which said memory is installed, for generating a predetermined capacitance;
   a detection processor for detecting a deflection of said housing in accordance with a shift of degrees of the capacitance between said electrodes;
   a thermo-sensor which measures a temperature in said housing in which said memory is installed; and a correction processor which corrects the shift of degrees of the capacitance between said electrodes in accordance with the temperature measured by said thermo-sensor, wherein said detection processor detects the physical impact applied to said housing in accordance with the deflection of said housing after the correction by said correction processor.

4. A data storage device comprising:

a memory, installed in a housing having a predetermined shape which stores predetermined confidential data;

a plurality of electrodes disposed on said housing in which said memory is installed, which generates a predetermined capacitance;

a detection processor which specifies a deflection of said housing in accordance with a shift of degrees of the capacitance between said electrodes to detect a physical impact applied to said housing;

a data canceler which cancels the confidential data stored in said memory when said detection processor detects the physical impact applied to said housing;

a thermo-sensor which measures a temperature in said housing in which said memory is installed; and a correction processor which corrects the shift of degrees of the capacitance between said electrodes in accordance with the temperature measured by said thermo-sensor, wherein said detection processor detects the physical impact applied to said housing in accordance with the deflection of said housing after the correction by said correction processor, detecting physical impact applied to said housing in accordance with the data generated by said generating data, wherein said data representing deflection of said housing represents a change of capacitance between two electrodes that are disposed on said housing.

5. A detection method comprising:

generating data representing a deflection of a housing in which a storage device for storing predetermined confidential data is installed;

measuring a temperature in said housing in which said storage device is installed;

correcting the data generated by said generating data in accordance with the measured temperature; and detecting a physical impact applied to said housing by specifying the deflection of said housing in accordance with the data representing the deflection of said housing after correction by said correcting data, wherein said data representing the deflection of said housing represents a change of capacitance between two electrodes that are disposed on said housing.

6. A detection method comprising:

measuring a capacitance between a plurality of electrodes disposed on a housing in which a memory for storing predetermined confidential data is installed;

measuring a temperature in said housing in which said memory is installed;

correcting the measured capacitance in accordance with the measured temperature; and detecting a physical impact applied to said housing by specifying a deflection of said housing in accordance with a shift of degrees of the capacitance after the correction.

7. A data storage device comprising:

a data storage in a housing;

a plurality of electrodes disposed on said housing; and a processor that determines a deflection of said housing based upon a capacitance between the plurality of electrodes, wherein the data storage stores confidential data, and wherein said processor controls said data storage to erase said confidential data when the determined deflection exceeds a predetermined range.

8. The device of claim 7, further comprising:

a temperature sensor that sends a temperature signal to said processor.

9. The device of claim 8, wherein said processor adjusts the determined deflection based upon said temperature signal.

10. The device of claim 7, wherein said processor determines said deflection based upon a change in capacitance between two of the plurality of electrodes.

* * * * *